Feb. 8, 1927.

C. J. RULISON 1,616,552

TRAP

Filed April 21, 1926

Inventor
Carroll J. Rulison

By

Attorney

Patented Feb. 8, 1927.

1,616,552

UNITED STATES PATENT OFFICE.

CARROLL J. RULISON, OF CLAY, NEW YORK.

TRAP.

Application filed April 21, 1926. Serial No. 103,504.

The purpose of the invention is to provide a trap of simple form designed particularly to produce the death of the victim practically instantaneously and without damage to the hide (which is particularly advantageous in the case of fur-bearing animals); and to provide a trap in which the jaw release is in the form of a double trigger so that it may be actuated by either or both feet of the animal.

With this purpose in view, the invention consists in a construction and combination of parts of which a preferred embodiment is illustrated in the accompanying drawings, wherein.

Figure 1:
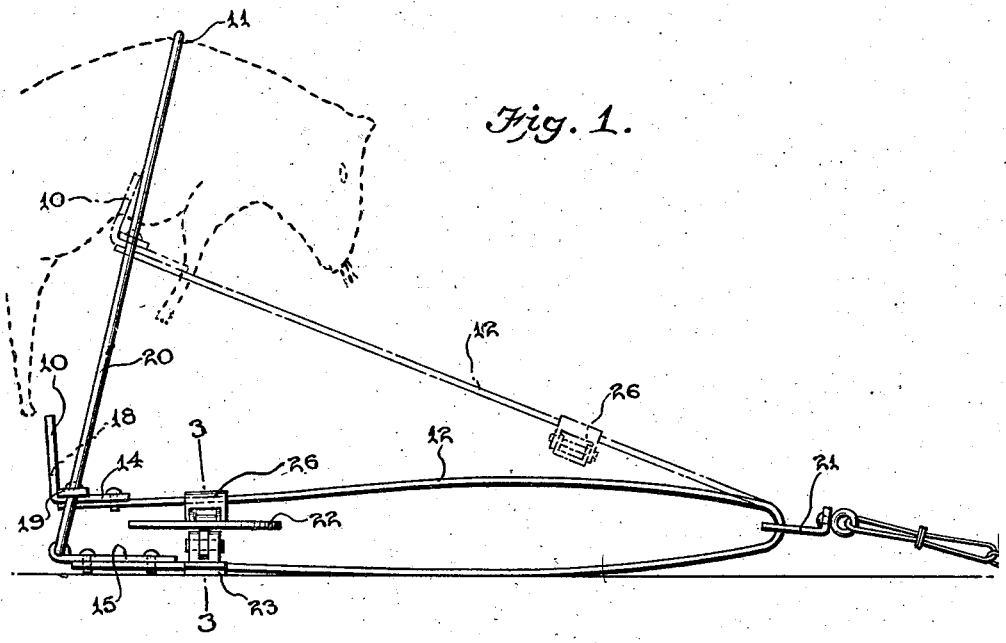
Figure 1 is a view in side elevation of the invention, the victim being indicated in dotted lines.
Figure 2:
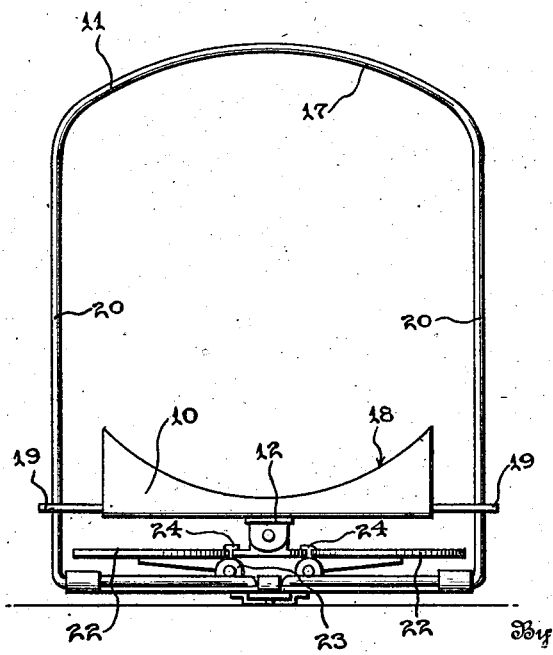
Figure 2 is a front elevational view.
Figure 3:
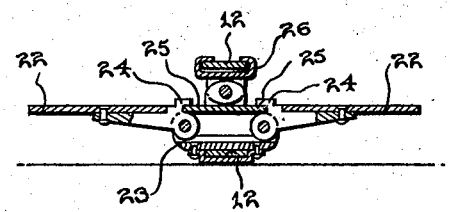
Figure 3 is a sectional view on the plane indicated by the line 3—3 of Figure 1.

The jaws 10 and 11 of the trap are spring-actuated, the former being movable relative to the latter but both being operatively connected by means of a flat spring 12 which is bent back on itself, having one terminal connected to the jaw 10, as indicated at 14, and the other terminal connected to the jaw 11, being secured to the plate 15 with which said jaw is connected. The jaw 11 is in the form of a wire loop of which the arched or bowed portion 17 is disposed opposite the arcuate edge 18 of the jaw 10, the latter being provided with lateral arms 19 slidably engaging the legs 20 of the jaw 11.

The setting of the trap comprises the bringing together of the elements or legs of the spring 12 which leaves the jaw separated and the trap is to be so placed that the victim passes through the looped jaw and over the bottom jaw 10. Having sprung the trap, the jaws are moved toward each other and the victim is grabbed by them with the looped portion of the jaw 11 over the back and the arcuate portion of the jaw 10 on the under side of the body and its quick death is produced either by the crushing of the vital organs or by strangulation.

A conventional tether 21 is employed for anchoring the trap.

The trip or trigger consists of foot plates 22 pivotally connected with the opposite ends of the slide 23 so that they are disposed on opposite sides of the spring. These trip plates are designed by means of hooks 24 to engage a plate 25 rockably mounted on a slide 26 also carried on the spring. When the hooks of the trip plates engage the rocking plate 25, the jaws 10 and 11 are separated and held in separated or set position for release by the victim upon stepping upon either or both of the trip plates. Both the trip plates and the rocking plate being mounted on slides movable on the elements of the spring, the trip plates may be set at various distances from the jaws to correspond with the body dimensions of the character of animal it is desired to trap.

The invention having been described, what is claimed as new and useful is:

1. A trap comprising cooperating jaws yieldingly impelled toward each other, and a victim-operated tripping device for holding said jaws separated and adjustable toward and away from the jaws.

2. A trap comprising cooperating jaws of which one is of looped form and the other disposed within the first and guided by the latter, an operating spring connecting the two jaws, and a tripping device carried by and adjustable along the spring toward and away from the jaws.

3. A trap comprising cooperating jaws of which one is of looped form and the other disposed within the first and guided by the latter, an operating spring connecting the two jaws, and a tripping device carried by and adjustable along the spring toward and away from the jaws, said tripping device comprising an element carried by one leg of the spring and a plurality of trip plates carried by the other leg of the spring and engageable with said element when said spring has been compressed.

4. A trap comprising cooperating jaws of which one is of looped form and the other disposed within the first and guided by the latter, an operating spring connecting the two jaws, and a tripping device carried by and adjustable along the spring toward and away from the jaws, said tripping device comprising an element carried by one leg of the spring and a plurality of trip plates carried by the other leg of the spring and engageable with said element when said spring has been compressed, said element comprising a slide and a plate rockably mounted thereon and the trip plates having hooks engageable with the terminal edges of said rocking plate.

In testimony whereof he affixes his signature.

CARROLL J. RULISON.